(12) United States Patent  
Heap

(10) Patent No.: US 7,853,386 B2
(45) Date of Patent: Dec. 14, 2010

(54) CONTROL ARCHITECTURE AND METHOD FOR TWO-DIMENSIONAL OPTIMIZATION OF INPUT SPEED AND INPUT TORQUE IN MODE FOR A HYBRID POWERTRAIN SYSTEM

(75) Inventor: Anthony H. Heap, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 139 days.

(21) Appl. No.: 11/561,166

(22) Filed: Nov. 17, 2006

(65) Prior Publication Data

US 2008/0120002 A1    May 22, 2008

(51) Int. Cl.
    *G06F 19/00* (2006.01)
(52) U.S. Cl. .............................. 701/54; 701/22; 701/51; 701/84; 701/87; 477/3; 477/143; 477/46; 477/156
(58) Field of Classification Search .................. 701/22, 701/51, 54; 477/3, 5
    See application file for complete search history.

(56) References Cited

U.S. PATENT DOCUMENTS

| | | | | |
|---|---|---|---|---|
| 5,667,029 A | * | 9/1997 | Urban et al. | 180/65.2 |
| 6,278,915 B1 | * | 8/2001 | Deguchi et al. | 701/22 |
| 6,554,088 B2 | * | 4/2003 | Severinsky et al. | 180/65.2 |
| 6,953,409 B2 | * | 10/2005 | Schmidt et al. | 475/5 |

* cited by examiner

*Primary Examiner*—Tuan C To
*Assistant Examiner*—Redhwan Mawari

(57) ABSTRACT

There is provided a control system for a powertrain system including an electro-mechanical transmission that is selectively operative in a plurality of fixed gear modes and continuously variable modes. The control system is adapted to execute the following steps, comprising determining a range of permissible engine input speeds and a range of permissible engine input torques, and determining motor input torques for the first and second electrical machines based upon the range of permissible engine input speeds and the range of permissible engine input torques. A cost is determined for each of the motor input torques. A preferred engine input speed and a preferred engine input torque are identified based upon the costs for the motor input torques.

9 Claims, 8 Drawing Sheets

US 7,853,386 B2

CONTROL ARCHITECTURE AND METHOD FOR TWO-DIMENSIONAL OPTIMIZATION OF INPUT SPEED AND INPUT TORQUE IN MODE FOR A HYBRID POWERTRAIN SYSTEM

TECHNICAL FIELD

This invention pertains generally to control systems for powertrain control systems employing electro-mechanical transmissions.

BACKGROUND OF THE INVENTION

Powertrain architectures comprise torque-generative devices, including internal combustion engines and electric machines, which transmit torque through a transmission device to a vehicle driveline. One such transmission includes a two-mode, compound-split, electro-mechanical transmission which utilizes an input member for receiving motive torque from a prime mover power source, typically an internal combustion engine, and an output member for delivering motive torque from the transmission to the vehicle driveline. Electrical machines, operatively connected to an electrical energy storage device, comprise motor/generators operable to generate motive torque for input to the transmission, independently of torque input from the internal combustion engine. The electrical machines are further operable to transform vehicle kinetic energy, transmitted through the vehicle driveline, to electrical energy potential that is storable in the electrical energy storage device. A control system monitors various inputs from the vehicle and the operator and provides operational control of the powertrain system, including controlling transmission gear shifting, controlling the torque-generative devices, and regulating the electrical power interchange between the electrical energy storage device and the electrical machines.

The exemplary electro-mechanical transmissions are selectively operative in fixed gear modes and continuously variable modes through actuation of the torque-transfer clutches, typically employing a hydraulic circuit to effect clutch actuation. A fixed gear mode occurs when rotational speed of the transmission output member is a fixed ratio of rotational speed of the input member from the engine, typically due to actuation of one or more torque-transfer clutches. A continuously variable mode occurs when rotational speed of the transmission output member is variable based upon operating speeds of one or more electrical machines. The electrical machines can be connected to the output shaft via actuation of a clutch, or by direct connection. Clutch actuation and deactivation is typically effected through a hydraulic circuit.

Engineers implementing powertrain systems having electro-mechanical transmissions are tasked with implementing control schemes to effectively monitor system states and control operation of various systems and actuators to effectively control powertrain operation. Such a system is described hereinafter.

SUMMARY OF THE INVENTION

In accordance with an embodiment of the invention, a method and an apparatus are provided to control operation of a powertrain system comprising a torque transmission device operative to transmit torque input from a plurality of torque-generative devices.

The method is directed to identify preferred operating conditions for operating a powertrain in a continuously variable mode operating range state. The exemplary powertrain comprises an internal combustion engine and first and second electrical machines and an electro-mechanical transmission selectively operative to transmit torque therebetween. The method comprises determining a range of engine inputs to the transmission, and determining a plurality of motor torques input from the first and second electrical machines based upon the range of engine inputs. A plurality of costs are determined, with each cost based upon the range of engine inputs and the motor torques for the first and second electrical machines determined thereupon. A preferred engine input is identified based upon the determined costs.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

Figure 1:
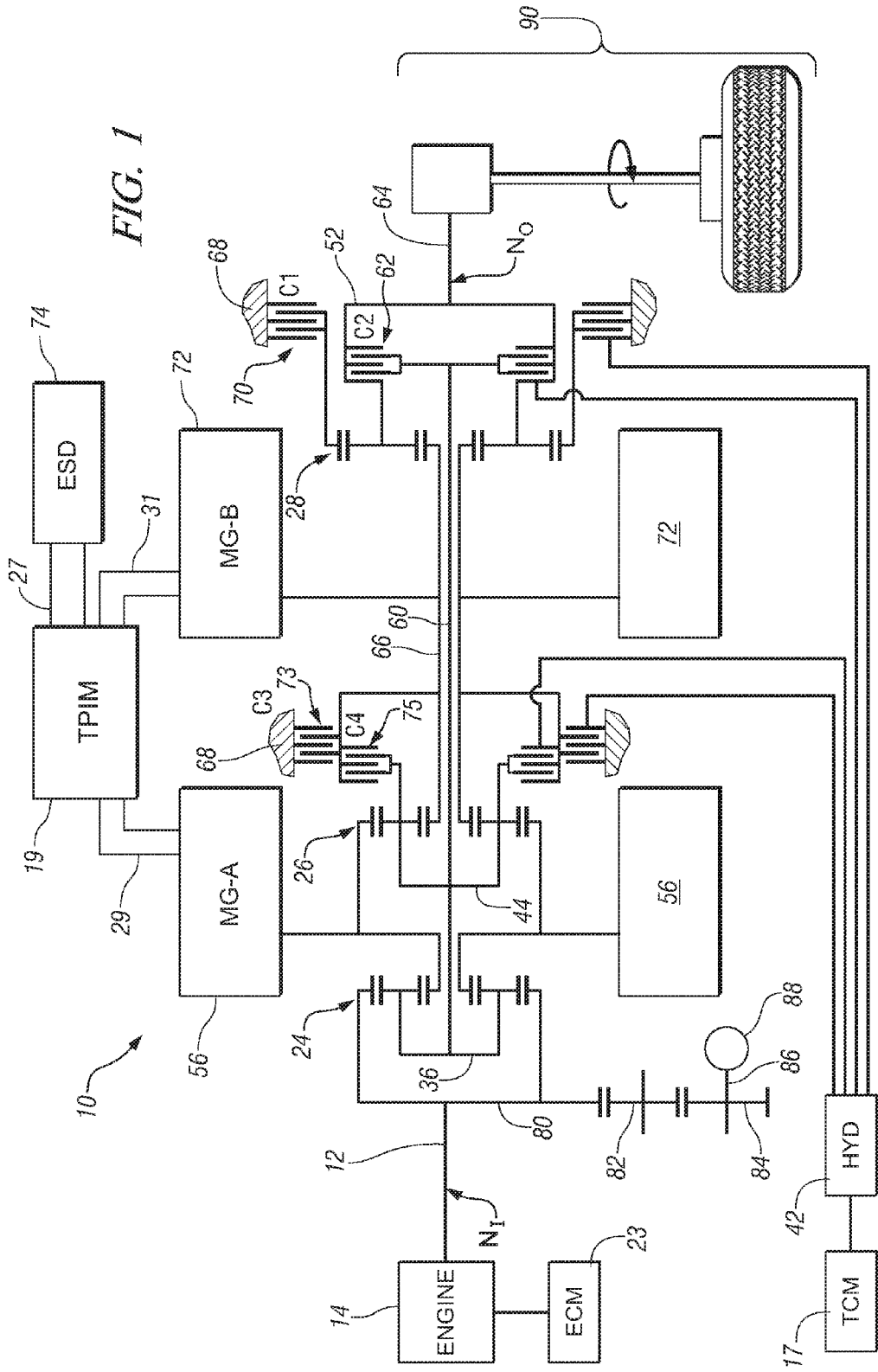
FIG. 1 is a schematic diagram of an exemplary powertrain, in accordance with the present invention.
Figure 2:
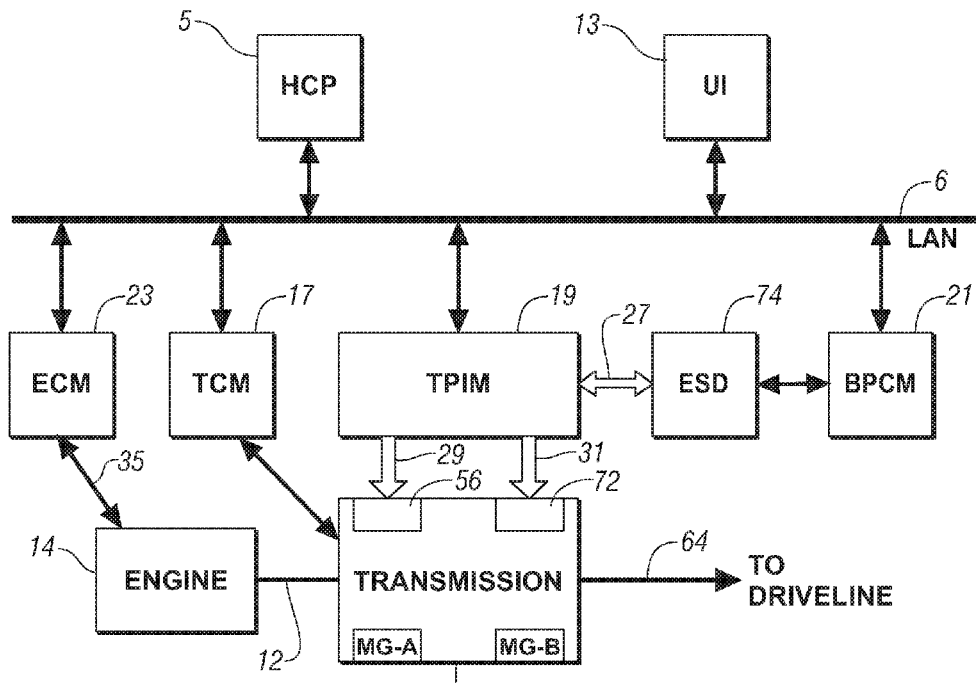
FIG. 2 is a schematic diagram of an exemplary architecture for a control system and powertrain, in accordance with the present invention.

Referring now to the drawings, wherein the showings are for the purpose of illustrating the invention only and not for the purpose of limiting the same, FIGS. 1 and 2 depict a system comprising an engine 14, transmission 10, control system, and driveline which has been constructed in accordance with an embodiment of the present invention.

Mechanical aspects of exemplary transmission 10 are disclosed in detail in commonly assigned U.S. Pat. No. 6,953,409, entitled "Two-Mode, Compound-Split, Hybrid Electro-Mechanical Transmission having Four Fixed Ratios", which is incorporated herein by reference. The exemplary two-mode, compound-split, electro-mechanical hybrid transmission embodying the concepts of the present invention is depicted in FIG. 1, and is designated generally by the numeral 10. The transmission 10 includes an input shaft 12 having an input speed, $N_I$ that is preferably driven by the internal combustion engine 14. The engine 14 has a crankshaft having characteristic speed $N_E$ which is operatively connected to the transmission input shaft 12. When a clutch device (not shown) operatively connects the engine and transmission, the engine speed $N_E$ and output torque $T_E$ can differ from transmission input speed $N_I$ and input torque $T_I$.

The transmission 10 utilizes three planetary-gear sets 24, 26 and 28, and four torque-transmitting devices, i.e., clutches C1 70, C2 62, C3 73, and C4 75. An electro-hydraulic control system 42, preferably controlled by transmission control module 17, is operative to control actuation and deactivation of the clutches. Clutches C2 and C4 preferably comprise hydraulically-actuated rotating friction clutches. Clutches C1 and C3 preferably comprise comprising hydraulically-actuated stationary devices grounded to the transmission case 68.

The three planetary gear sets 24, 26 and 28 each comprise simple planetary gear sets. Furthermore, the first and second planetary gear sets 24 and 26 are compounded in that the inner gear member of the first planetary gear set 24 is conjoined to an outer gear member of the second planetary gear set 26, and connected to a first electrical machine comprising a motor/generator 56, referred to as MG-A.

The planetary gear sets 24 and 26 are further compounded in that carrier 36 of the first planetary gear set 24 is conjoined through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, through clutch C2 62. The carrier 52 of the third planetary gear set 28 is connected directly to the transmission output member 64, which has an output rotational speed, $N_O$. An inner gear member of the second planetary gear set 26 is connected to an inner gear member of the third planetary gear set 28 through a sleeve shaft 66 that circumscribes shaft 60, and is connected to a second electrical machine comprising a motor/generator 72, referred to as MG-B.

All the planetary gear sets 24, 26 and 28 as well as MG-A 56 and MG-B 72 are coaxially oriented, as about the axially disposed shaft 60. MG-A and MG-B are both of an annular configuration which permits them to circumscribe the three planetary gear sets 24, 26 and 28 such that the planetary gear sets 24, 26 and 28 are disposed radially inwardly of MG-A and MG-B. Transmission output member 64 is operably connected to a vehicle driveline 90 to provide motive output torque, $T_O$ to vehicle wheels. Each clutch is preferably hydraulically actuated, receiving pressurized hydraulic fluid from a pump, described below, via an electro-hydraulic control circuit 42.

The transmission 10 receives input torque from the torque-generative devices, including the engine 14 and the MG-A 56 and MG-B 72, and referred to as '$T_I$', '$T_A$', and '$T_B$' respectively, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to TPIM 19 via DC transfer conductors 27. The TPIM 19 is an element of the control system described hereinafter with regard to FIG. 2. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality.

In motoring control, the respective inverter receives current from the DC transmission lines and provides AC current to the respective electrical machine, i.e., MG-A and MG-B, over transfer conductors 29 and 31. In regeneration control, the respective inverter receives AC current from the electrical machine over transfer conductors 29 and 31 and transmits current to the DC lines 27. The net DC current provided to or from the inverters determines the charge or discharge operating mode of the electrical energy storage device 74. Preferably, MG-A 56 and MG-B 72 are three-phase AC machines each having a rotor operable to rotate within a stator that is mounted on a case of the transmission. The inverters comprise known complementary three-phase power electronics devices.

Referring now to FIG. 2, a schematic block diagram of the control system, comprising a distributed control module architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A and MG-B 56, 72. The distributed control module architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain including the transmission 10 through a request for a torque output. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: an operator torque request ('$T_{O\_REQ}$') output to driveline 90, the input torque $T_I$ originating from the engine, clutch torque, ('$T_{CL\_N}$') for the N various torque-transfer clutches C1, C2, C3, C4 of the transmission 10; and motor input torques $T_A$ and $T_B$ for MG-A and MG-B. The TCM 17 is operatively connected to the electro-hydraulic control circuit 42, including monitoring various pressure sensing devices (not shown) and generating and executing control signals for various solenoids to control pressure switches and control valves contained therein.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command from the HCP 5, and generates a desired axle torque, and an indication of actual input torque, $T_I$, to the transmission, which is communicated to the HCP 5. For simplicity, ECM 23 is shown generally having bi-directional interface with engine 14 via aggregate line 35. Various other parameters that may be sensed by ECM 23 include engine coolant temperature, engine input speed, $N_E$, to shaft 12 which translate to transmission input speed, $N_I$, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques ($T_{CL\_EST\_N}$) for each of the N clutches C1, C2, C3, and, C4 and rotational speed, $N_O$, of the output shaft 64. Other actuators and sensors may be used to provide additional information from the TCM to the HCP for control purposes. The TCM 17 monitors inputs from pressure switches and selectively actuates pressure control solenoids and shift solenoids to actuate various clutches to achieve various transmission operating modes, as described hereinbelow.

The BPCM 21 is signally connected one or more sensors operable to monitor electrical current or voltage parameters of the ESD 74 to provide information about the state of the batteries to the HCP 5. Such information includes battery state-of-charge, battery voltage and available battery power.

The TPIM 19 includes previously referenced power inverters and motor control modules configured to receive motor control commands and control inverter states therefrom to provide motor drive or regeneration functionality. The TPIM 19 is operable to generate the torque commands for MG-A 56 and MG-B 72, i.e., $T_A$ and $T_B$, based upon input from the HCP 5, which is driven by operator input through UI 13 and system operating parameters. The motor torque commands for MG-A and MG-B are implemented by the control system, including the TPIM 19, to control MG-A and MG-B. Individual motor speed signals for MG-A and MG-B are derived by the TPIM 19 from the motor phase information or conventional rotation sensors. The TPIM 19 determines and communicates motor speeds to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds ('ms') during ongoing engine and vehicle operation. Alternatively, algorithms may be executed in response to occurrence of an event.

The exemplary two-mode, compound-split, electro-mechanical transmission operates in several operating range states, comprising fixed gear operating modes and continuously variable operating modes with the engine on and off, described with reference to FIG. 1, and Table 1, below.

TABLE 1

| Transmission Operating Range State | Actuated Clutches | |
|---|---|---|
| Mode I - Engine Off (M1_Eng_Off) | C1 70 | |
| Mode I - Engine On (M1_Eng_On) | C1 70 | |
| Fixed Ratio 1 (GR1) | C1 70 | C4 75 |
| Fixed Ratio 2 (GR2) | C1 70 | C2 62 |
| Mode II - Engine Off (M2_Eng_Off) | C2 62 | |
| Mode II - Engine On (M2_Eng_On) | C2 62 | |
| Fixed Ratio 3 (GR3) | C2 62 | C4 75 |
| Fixed Ratio 4 (GR4) | C2 62 | C3 73 |

The various transmission operating range states described in the table indicate which of the specific clutches C1, C2, C3, and C4 are engaged or actuated for each of the operating range states. Additionally, in various transmission operating range states, MG-A and MG-B may each operate as electrical motors to generate motive torque, or as a generator to generate electrical energy. A first mode, i.e., Mode I, is selected when clutch C1 70 is actuated in order to "ground" the outer gear member of the third planetary gear set 28. The engine 14 can be either on or off. A second mode, i.e., Mode II, is selected when clutch C1 70 is released and clutch C2 62 is simultaneously actuated to connect the shaft 60 to the carrier of the third planetary gear set 28. Again, the engine 14 can be either on or off. For purposes of this description, Engine Off is defined by engine input speed, $N_E$, being equal to zero revolutions per minute (RPM), i.e., the engine crankshaft is not rotating. Other factors outside the scope of the invention affect when the electrical machines 56, 72 operate as motors and generators, and are not discussed herein.

The control system, shown primarily in FIG. 2, is operable to provide a range of transmission output speeds at shaft 64 from relatively slow to relatively fast within each operating range state. The combination of two modes with a slow-to-fast output speed range in each range state allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e., either clutch C1 62 or C2 70, and by the controlled speed and torque of the electrical machines 56 and 72, which can be referred to as a continuously variable transmission mode. Certain ranges of operation are described below in which fixed gear ratios are achieved by applying an additional clutch. This additional clutch may be clutch C3 73 or C4 75, as shown in the table, above.

When the additional clutch is applied, fixed ratio operation of input-to-output speed of the transmission, i.e., $N_I/N_O$, is achieved. The rotations of machines MG-A and MG-B 56, 72 are dependent on internal rotation of the mechanism as defined by the clutching and proportional to the input speed measured at shaft 12. The machines MG-A and MG-B function as motors or generators. They are completely independent of engine to output power flow, thereby enabling both to be motors, both to function as generators, or any combination thereof. This allows, for instance, during operation in Fixed Ratio 1 that motive power output from the transmission at shaft 64 is provided by power from the engine and power from MG-A and MG-B, through planetary gear set 28 by accepting power from ESD 74.

Figure 3:
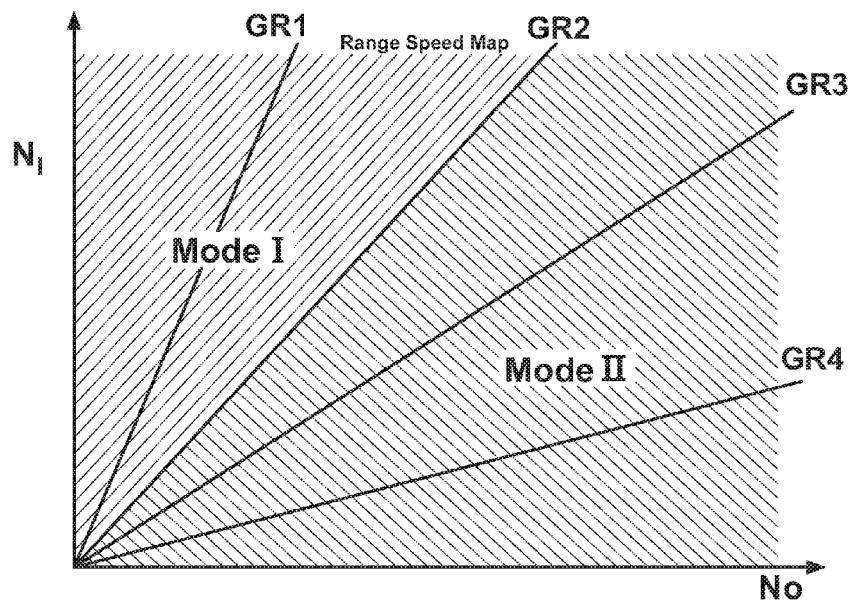
FIG. 3 is a graphical depiction, in accordance with the present invention.

Referring now to FIG. 3, various transmission operating modes are plotted as a function of transmission output speed, $N_O$, and transmission input speed, $N_I$ for the exemplary powertrain control system shown in FIGS. 1 and 2. The Fixed Ratio operation is shown as individual lines for each of the specific gear ratios, GR1, GR2, GR3, and GR4, as described with reference to Table 1, above. The continuously variable Mode operation is shown as ranges of operation for each of Mode I and Mode II. The transmission operating range state is switched between Fixed Ratio operation and continuously variable Mode operation by activating or deactivating specific clutches. The control system is operative to determine a specific transmission operating mode based upon various criteria, using algorithms and calibrations executed by the control system, and is outside the scope of this invention. Selection of the operating range state of the transmission depends primarily on the operator torque request $T_{O\_REQ}$ and the ability of the powertrain to meet that operator torque request.

Referring to Table 1 and again to FIG. 3, the low range operating state includes selective actuation of clutches C2, C1, and C4, facilitating operation in any one of continuously variable Mode I, and fixed gears GR1, GR2, and GR3. The high range operating state includes selective actuation of clutches C2, C3, and C4, facilitating operation in any one of continuously variable Mode II and fixed gears GR3 and GR4. It should be recognized that ranges of continuously variable operation for Mode I and Mode II may overlap.

In response to an operator's action, as captured by the UI 13, the supervisory HCP control module 5 and one or more of the other control modules determine the operator torque request, $T_{O\_REQ}$, at shaft 64. Selectively operated components of the transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque which affects how and when the vehicle accelerates or decelerates.

Final vehicle acceleration is affected by other factors, including, e.g., road load, road grade, and vehicle mass. The operating mode is determined for the exemplary transmission based upon a variety of operating characteristics of the powertrain. This includes demand for an operator demand for torque, typically communicated through inputs to the UI 13 as previously described. Additionally, a demand for output torque is predicated on external conditions, including, e.g., road grade, road surface conditions, or wind load. The operating mode may be predicated on a powertrain torque demand caused by a control module command to operate of the electrical machines in an electrical energy generating mode or in a torque generating mode. The operating mode can be determined by an optimization algorithm or routine operable to determine optimum system efficiency based upon operator demand for power, battery state of charge, and energy efficiencies of the engine 14 and MG-A and MG-B 56, 72. The control system manages torque inputs from the engine 14 and MG-A and MG-B 56, 72 based upon an outcome of the executed optimization routine, and system optimization occurs to optimize system efficiencies to improve fuel economy and manage battery charging. Furthermore, operation can be determined based upon a fault in a component or system. The HCP 5 monitors the parametric states of the torque-generative devices, and determines the output of the transmission required to arrive at the desired torque output, as described hereinbelow. Under the direction of the HCP 5, the transmission 10 operates over a range of output speeds from slow to fast in order to meet the operator demand.

Referring now to FIGS. 4-9, a preferred method of controlling a hybrid powertrain system, described with referent to operating the exemplary powertrain of FIGS. 1, 2, and 3, is now described.

Figure 4:
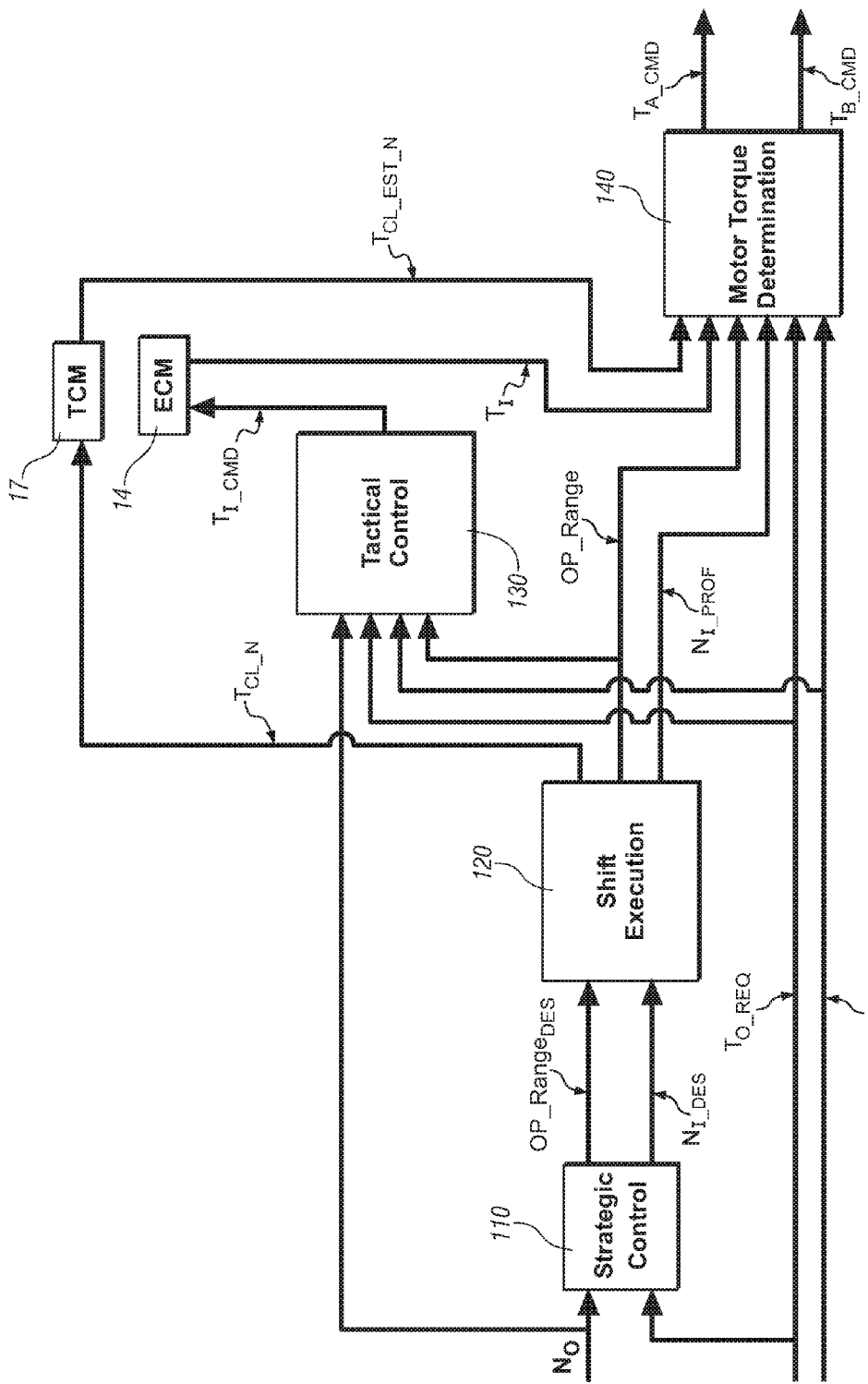
FIGS. 4-9 are schematic flowcharts, in accordance with the present invention, and, FIG. 10 is a graphical depiction, in accordance with the present invention.

Referring specifically to FIG. 4, the method and system described herein comprises an aspect of strategic control optimization (Block 110), wherein a preferred or desired operating range state (Op_Range$_{DES}$) is selected based primarily upon output speed, $N_O$ of shaft 64 and the operator request for torque, $T_{O\_REQ}$. Output of the strategic control includes the preferred or desired operating range state ('Op_Range$_{DES}$') and desired input speed ('$N_{I\_DES}$') each which are input to a shift execution control block 120. Other aspects of the overall architecture for strategic optimization and control of the exemplary powertrain are described in co-pending U.S. patent application Ser. No. 11/561,140, entitled CONTROL ARCHITECTURE FOR OPTIMIZATION AND CONTROL OF A HYBRID POWERTRAIN SYSTEM, and in commonly assigned, co-pending U.S. patent application Ser. No. 11/561,156, entitled CONTROL ARCHITECTURE FOR SELECTION OF OPTIMAL MODE OR GEAR AND INPUT SPEED FOR A HYBRID POWERTRAIN SYSTEM, both which are incorporated herein by reference in their entireties. The method comprises the following steps, executed as one or more algorithms in the control modules of the distributed control module architecture. The method includes monitoring output of the transmission, typically $N_O$, the operator request for torque, $T_{O\_REQ}$, and, available battery power $P_{BAT\_MIN}$ and $P_{BAT\_MAX}$. At least one allowable operating range state, described with reference to Table 1, is identified. A torque range for each of the allowable range states is determined. A cost for operating in each of the determined torque ranges is calculated, and one of the determined torque ranges is selected as a preferred operating range state based upon the calculated costs for each determined torque range. The powertrain is controlled to the preferred operating range state thereafter.

Figure 5:
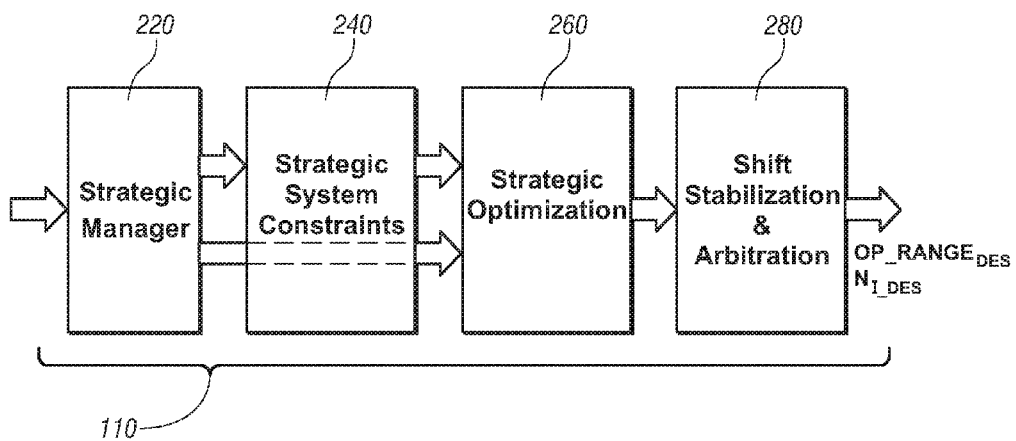

Referring now to FIG. 5, a functional block diagram depicts inputs to a strategic manager segment 220, which has outputs to a system constraint segment 240 and an optimization segment 260. The output of the system constraint segment 240 is also input to the optimization segment 260. The outputs of the optimization segment 260 are input to the shift stabilization and arbitration segment 280, which has an output comprising the preferred operating range state.

Figure 6:
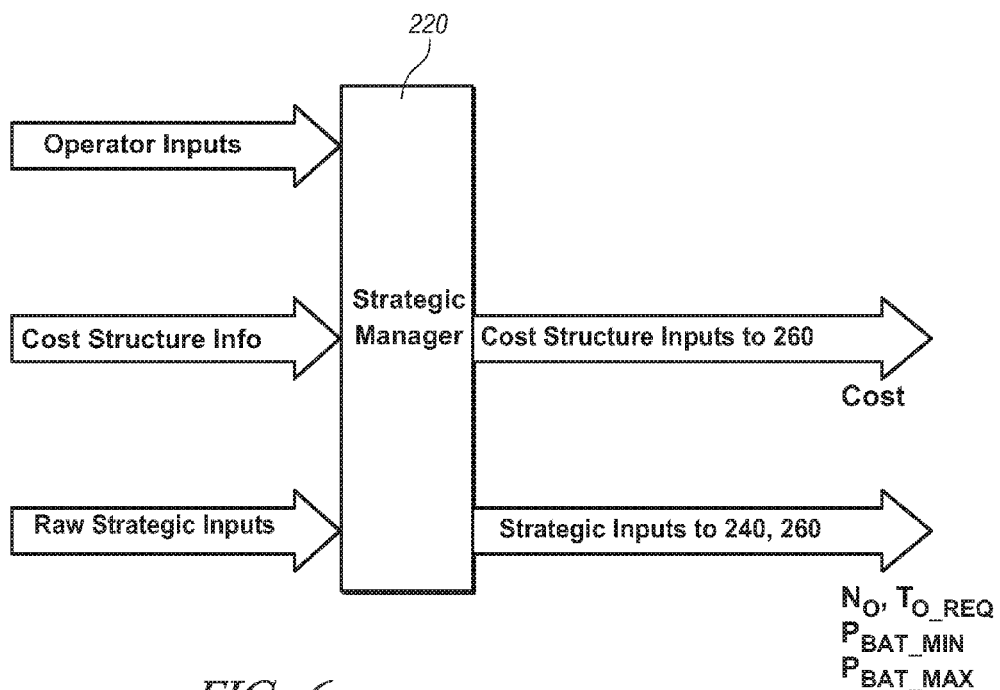

Referring now to FIG. 6, the strategic manager segment 220 includes operator inputs, typically torque requests and other inputs through the UI 13, cost structure information, described hereinbelow, and raw strategic inputs, comprising raw parametric signals related to the hybrid powertrain operating conditions, including those related to the ESD 74. Outputs from the strategic manager segment 120 comprise cost structure information COST, strategic inputs including transmission output speed No, range of available battery power $P_{BAT\_MIN}$ and $P_{BAT\_MAX}$, and the operator torque request $T_{O\_REQ}$.

Figure 7:
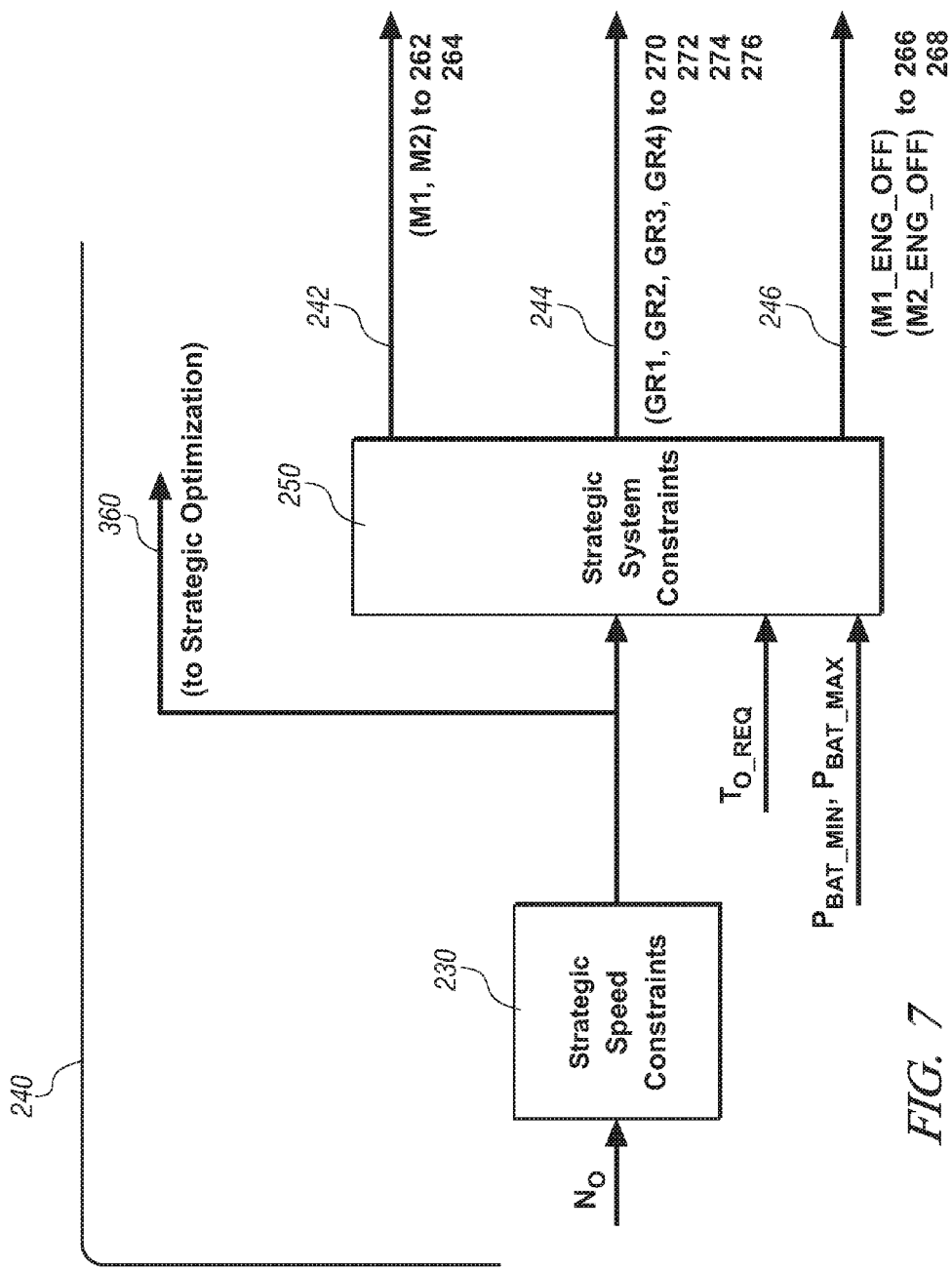

Referring now to FIG. 7, a detailed description of the strategic system constraints segment 240 is now described. The output speed $N_O$ is input to strategic speed constraint segment 230. The speed constraint segment 230 determines maximum and minimum input speeds for operating in each continuously variable mode, i.e., $N_{I\_MIN}$_M1, $N_{I\_MAX}$_M1, $N_{I\_MIN}$_M2, and $N_{I\_MAX}$_M2, in order to determine which of the hybrid operating range states, i.e., GR1, GR2, GR3, GR4, M1_Eng_Off, M1_Eng_On, M2_Eng_Off, and M2_Eng_On, are allowable based upon current operating constraints, specifically output speed $N_O$. The determined allowable hybrid operating range states are output to segment 260.

The speed constraint segment 230 determines maximum and minimum input speeds for operating in each mode, i.e., $N_{I\_MAX}$ and $N_{I\_MIN}$. These parameters are input to the system constraints segment 250, along with the range of available battery power $P_{BAT\_MIN}$ and $P_{BAT\_MAX}$ to determine which of the hybrid operating range states, specifically M1_Eng_On and M2_Eng_On, are allowable based upon current operating constraints. Output path 242 from segment 240 supply inputs to optimization segment 260. Output path 242 provides relevant system constraint information, comprising a range of torque values in form of minimum and maximum output torques ($T_{O\_MAX}$, $T_{O\_MIN}$) and maximum and minimum input torques ($T_{I\_MAX}$, $T_{I\_MIN}$) over the range of engine input speeds $N_{I\_MIN}$ to $N_{I\_MAX}$ for each operating mode (M1, M2) with the engine on. This information is communicated to each of segments 262 and 264 of segment 260.

Figure 8:
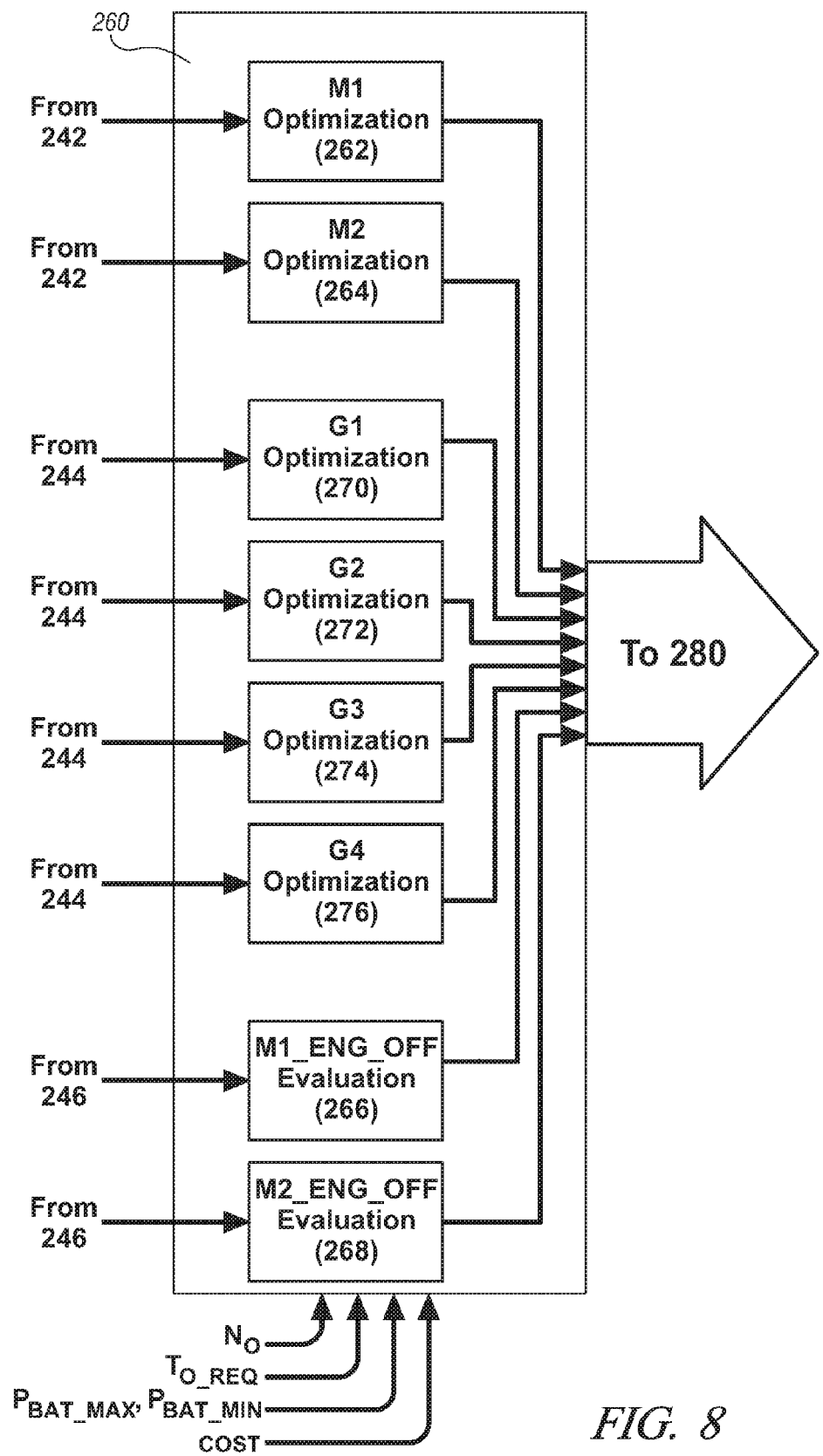
Figure 9:
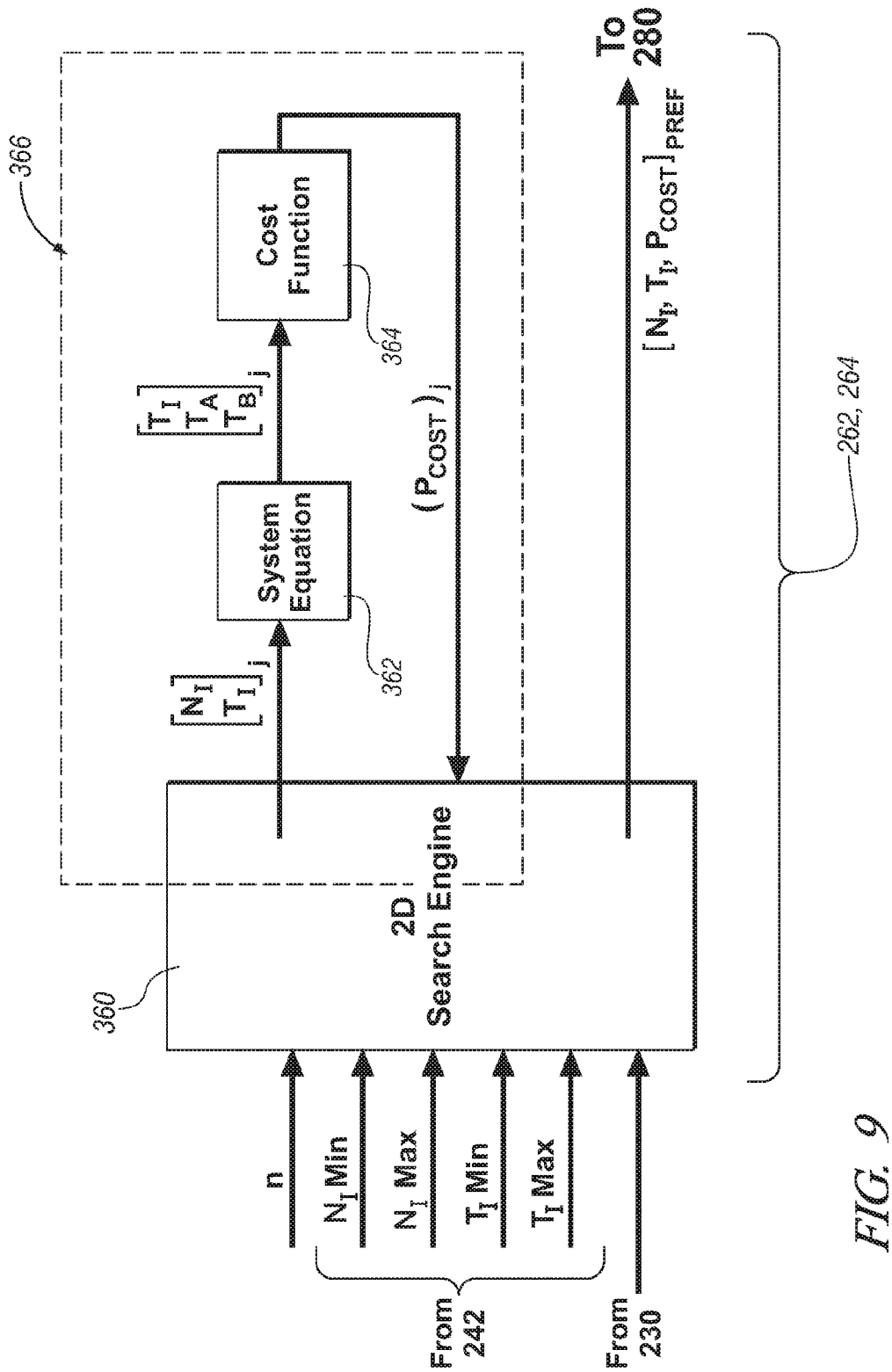
Figure 10:
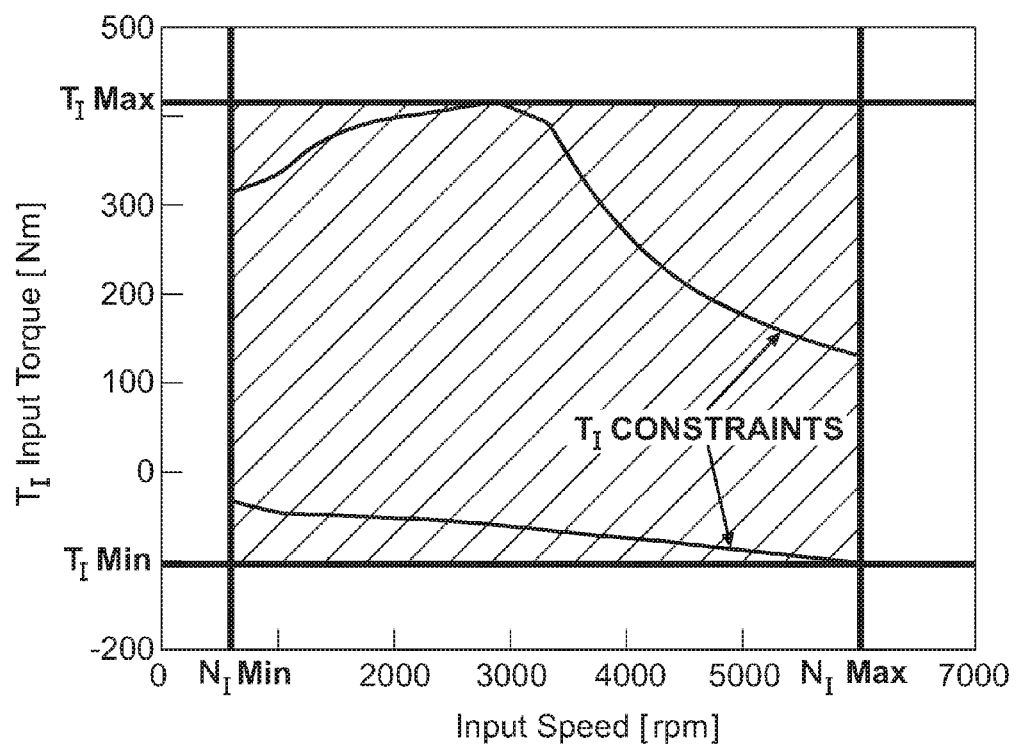

Referring now to FIGS. 8, 9 and 10, strategic optimization is now described. Segments 262 and 264, along with segments 266, 268, 270, 272, 274 and 276 each comprise optimization segments. In each of segments 262 and 264, an optimum operating cost, $P_{COST}$, is determined for each of the permissible operating range states, based upon the inputs previously described, including the previously described range of torque values and costs related to fuel economy, emissions, battery life, and driveability, among other inputs. The optimum operating cost preferably comprises a minimum operating cost at an operating point attainable within the range of torque values for each operating range state. The outputs of segments 262 and 264 of the optimization segment 260 are input to the shift stabilization and arbitration segment 280. In this segment, one of the determined operating range states output from segment 260 is selected as a preferred operating range state based upon the calculated costs. The preferred operating range state is typically the operating range state having the minimum associated cost, as determined in segment 260. The powertrain is controlled to the preferred operating range state thereafter, although shifting gears and shifting the operating range state may be limited based upon other operating needs related to shift stabilization and powertrain control. This operation is preferably executed during each 100 ms loop cycle.

The cost structure information input to the strategic manager segment 220 and used in optimization segment 260 preferably comprises operating costs which are generally determined based upon factors related to vehicle driveability, fuel economy, emissions, and battery life for the determined torque range. Furthermore, costs are assigned and associated with fuel and electrical power consumption associated with a specific operating point of the powertrain system for the vehicle. Lower operating costs are generally associated with lower fuel consumption at high conversion efficiencies, lower battery power usage, and lower emissions for an operating point, and take into account a current operating range state of the powertrain system. The optimum operating cost ($P_{COST}$) can be determined by calculating a total powertrain system loss, comprising an overall system power loss and a cost penalty, such as can be associated with controlling battery state of charge. The overall system power loss comprises a term based upon engine power loss driven by fuel economy and exhaust emissions, plus losses in the mechanical system (e.g., gears, pumps, belts, pulleys, valves, chains), losses in the electrical system (e.g., wire impedances and switching and solenoid losses), and heat losses. Other losses include electrical machine power losses and internal battery power losses. Other factors may also be considered, including factors related to battery life due to depth of discharge of the ESD 74, current ambient temperatures and their effect on state of charge of the battery. Operating costs are preferably developed relative to specific powertrain/vehicle applications during vehicle calibration pre-production. An exemplary method for determining engine power losses are described in commonly assigned U.S. Patent Application Publication Number 2005/0256633 A2, entitled COST STRUCTURE METHOD INCLUDING FUEL ECONOMY AND ENGINE EMISSION CONSIDERATIONS, the contents of which are incorporated herein by reference.

Referring now to FIGS. 9 and 10, the method to determine preferred operating conditions for operating the exemplary powertrain in either of Mode I or Mode II of the continuously variable mode operating range state is described, comprising operations executed in each of segments 262 and 264. The range of permissible engine input speeds and permissible input torques are input from block 242 to block 360, along with output from block 230, which comprises the determined allowable hybrid operating range states. Segment 360 comprises a two-dimensional search engine ("2D Search Engine"). The two-dimensional search engine 360 iteratively generates parametric values for engine inputs comprising engine speed and engine torque $[N_I, T_I]_j$, for execution in an iterative loop 366. The subscript "j" refers to a specific iteration, and ranges in value from 1 to n. The quantity of iterations, n, can be generated by any one of a number of methods, either internal to the search engine, or as a part of the overall method. The parametric values for engine speed and engine torque $[N_I, T_I]_j$ are input to a system equation 362, from which parametric values for motor torques $T_A$ and $T_B$ are determined. The motor torques $T_A$ and $T_B$ and input torque $T_I$ are input to a cost function 364, which determines a cost $(P_{COST})_j$ for operating the exemplary powertrain to achieve the specific parametric input speed $N_I$, and input torque $T_I$ of the iteration step, j. The cost determined for each iteration is returned and captured, or analyzed, in the search engine 360 depending upon specifics of the search engine 360. The search engine 360 iteratively evaluates parametric values for the cost $(P_{COST})_j$ and selects new values for $[N_I, T_I]$ based upon feedback to search for a best cost. The search engine 360 identifies a preferred cost, which comprises a minimum cost for all the iteratively calculated parametric values in this embodiment. The preferred cost and corresponding values for input speed and input torque $[N_I, T_I, P_{COST}]_{PREF}$ are output to block 280. Outputs from the operations executed in each of segments 262 and 264 are input to segment 280.

Referring now to FIG. 10, the method includes determining a range of permissible engine input speeds $N_{I\_MIN}$ to $N_{I\_MAX}$, which can be the same for both Modes I and II, but may vary. A range of permissible input torques $T_{I\_MIN}$ to $T_{I\_MAX}$ is determined over the range of permissible input speeds. The range of allowable parametric values for the range of permissible input torques $T_I$ and permissible input speeds $N_I$ are depicted for the exemplary powertrain system, wherein $N_{I\_MIN}$ ("$N_I$Min") comprises minimum engine input speed, e.g., a minimum engine speed, shown herein at about 600 to 700 revolutions per minute ("rpm"), and $N_{I\_MAX}$ ("$N_I$Max") comprises a maximum engine speed, e.g., an engine maximum speed of about 6000 rpm. The permissible input torques comprise the maximum input torque $T_{I\_MAX}$ ("$T_I$Max"), minimum input torque $T_{I\_MIN}$ ("$T_I$Min"), and $T_I$ constraint lines. The $T_I$ constraint lines comprise practical constraints for the specific embodiment, defined in segment 240 based upon $N_I$. The $T_I$ constraint limitations reduce the range of permissible input torques which need searched at specific input speeds.

The permissible input torques $T_I$ and input speeds $N_I$ are preferably input through line 242 for either of Mode I and Mode II to segment 260, which comprises an element of either of segments 262 for Mode I and 264 for Mode II, and comprise an output from segment 240, described above. When the exemplary transmission is operated in one of the continuously variable modes Mode I or Mode II, the speed relationship between MG-A, MG-B, $N_I$ and $N_O$ is defined as shown in Eq. 1, below:

$$\begin{bmatrix} N_A \\ N_B \end{bmatrix} = \begin{bmatrix} b_{11} & b_{12} \\ b_{21} & b_{22} \end{bmatrix} \begin{bmatrix} N_I \\ N_O \end{bmatrix} \quad [1]$$

wherein $N_I$ comprises the input speed from engine 14, $N_O$ is the transmission output speed, $N_A$ and $N_B$ are the operating speeds for MG-A 56 and MG-B 72, and $b_{11}$, $b_{12}$, $b_{21}$, $b_{22}$, are known scalar values determined for the specific application in the specific operating range state. Therefore, the determined scalar values for $b_{11}$, $b_{12}$, $b_{21}$, $b_{22}$ are specific to each of Mode I and Mode II. In this application, when the transmission output speed, $N_O$ is known, there is one degree of freedom in $N_I$ for the engine 14, by which $N_A$ and $N_B$ can be determined.

The torque relationship between MG-A, MG-B, $N_I$ and $N_O$ is defined as shown in Eq. 2, below:

$$\begin{bmatrix} T_A \\ T_B \end{bmatrix} = \begin{bmatrix} d_{11} & d_{12} & d_{13} & d_{14} \\ d_{21} & d_{22} & d_{23} & d_{24} \end{bmatrix} \begin{bmatrix} T_I \\ T_O \\ \dot{N}_I \\ \dot{N}_O \end{bmatrix} \quad [2]$$

wherein $T_I$ is the input torque from engine 14, $T_O$ is the transmission output torque, $T_A$ and $T_B$ are the operating torques for MG-A 56 and MG-B 72, $\dot{N}_I$ and $\dot{N}_O$ represent time-rate changes in input speed and output speed of the engine 14, and $d_{11}$, $d_{12}$, $d_{13}$, $d_{14}$, $d_{21}$, $d_{22}$, $d_{23}$, $d_{24}$ are known scalar values determined for each operating range state, i.e., either of Mode I and Mode II, of the application. In this application, when the transmission output torque $T_O$ is known, there is one degree of torque freedom in $T_I$ for the engine 14, by which $T_A$ and $T_B$ can be determined.

The ranges of permissible input torques $T_{I\_MIN}$ to $T_{I\_MAX}$, and permissible input speeds $N_{I\_MIN}$ to $N_{I\_MAX}$, comprise boundary conditions that are input to segment 360, which comprises a two-dimensional search engine including iterative search loop 366. The two-dimensional search engine comprises any one of several known methods executed as an algorithm in one of the control modules which is operative to generate parametric values for $N_I$ and $T_I$ within the ranges of permissible values, output the parametric values $[N_I, T_I]_j$ to the iteration loop 366 to determine a correlated cost, $(P_{COST})_j$, and evaluate the resultant, i.e., $(P_{COST})_j$ in the search engine 360. The search engine determines a preferred resultant cost, i.e., $[N_I, T_I, P_{COST}]_{PREF}$, by comparing the resultant cost from each iteration with a previously determined resultant cost. When the preferred resultant comprises a minimum value for the correlated cost, the engine 360 selects and captures and stores the lesser value of the resultant cost and the previously determined resultant cost. When the search engine has executed the search over the range of parametric values for $N_I$, $T_I$, the final captured resultant comprises the preferred cost and associated input speed and torque $[N_I, T_I, P_{COST}]_{PREF}$, which is then output to block 280.

The two-dimensional search engine 360 can comprise any one of several known search engines operative to generate parametric values for $N_I$ and $T_I$ within the ranges of permissible values therefore. By way of example, one such search engine iteratively generates combinations of inputs over the entire range of permissible input torques $T_{I\_MIN}$ to $T_{I\_MAX}$, and over the entire range of permissible input speeds $N_{I\_MIN}$ to $N_{I\_MAX}$. By way of example, another search engine referred to as a direct search method comprises a heuristic sampling search process wherein parametric values for $N_I$ and $T_I$ are determined for input to the system equation (Block 362). The two-dimensional direct search method comprises a known method for solving optimization problems that does not require any information about the gradient of the objective function, and is applicable to a method wherein there are two or more degrees of freedom, which comprise independent variables $N_I$ and $T_I$ in this embodiment. The direct search method comprises an algorithm that searches a set of points around the first or current parametric values, looking for the value of the objective function, i.e., the output of the cost function, to be lower than the value at the current point. Regardless of the search engine utilized, it resides as an algorithm in one of the control modules for execution during ongoing operation of the vehicle.

The system equation (Block 362) derived from Eqs. 1 and 2, provides the motor values for MG-A and MG-B is as follows in Eq. 3:

$$\begin{bmatrix} T_A \\ T_B \end{bmatrix} = \begin{bmatrix} a_{11} & a_{12} \\ a_{21} & a_{22} \end{bmatrix} \begin{bmatrix} T_i \\ T_o \end{bmatrix} + \begin{bmatrix} b_1 \\ b_2 \end{bmatrix} \quad [3]$$

wherein $a_{11}$, $a_{12}$, $a_{21}$, $a_{22}$, and $b_1$ and $b_2$ are known scalar values determined for the specific application, and for the specific mode of operation, i.e., Mode I or Mode II.

The calculated parametric values for motor torques $T_A$ and $T_B$ which are output from Eq. 3 are input to the cost function (Block 364) to calculate a cost, $P_{COST}$, which is associated with the selected parametric values for $T_I$ and $N_I$. The cost ($P_{COST}$, $N_I$, $T_I$) are input back through the search loop 366 to segment 360, which iteratively executes the two-dimensional search method over the range of permissible input torques $T_I$ from the engine and input speeds $N_I$ to converge on an optimal value for cost, $P_{COST}$. The optimal value for cost, $P_{COST\_PREF}$ is preferably a minimum cost value in this embodiment.

The cost information used in the cost function 364 preferably comprises operating costs which are generally determined based upon factors related to vehicle driveability, fuel economy, emissions, and battery life for the determined torque range. Furthermore, costs are assigned and associated with fuel and electrical power consumption associated with a specific operating point of the powertrain system for the vehicle. Lower operating costs are generally associated with lower fuel consumption at high conversion efficiencies, lower battery power usage, and lower emissions for an operating point, and take into account a current operating range state of the powertrain system. The optimum operating cost ($P_{COST}$) can be determined by calculating a total powertrain system loss, comprising an overall system power loss and a cost penalty, such as can be associated with controlling battery state of charge. The overall system power loss comprises a term based upon engine power loss driven by fuel economy and exhaust emissions, plus losses in the mechanical system (e.g., gears, pumps, belts, pulleys, valves, chains), losses in the electrical system (e.g. wire impedances and switching and solenoid losses), and heat losses. Other losses include electrical machine power losses and internal battery power losses. Other factors may also be considered, including factors related to battery life due to depth of discharge of the ESD 74, current ambient temperatures and their effect on state of charge of the battery. Operating costs are preferably developed relative to specific powertrain/vehicle applications during vehicle calibration pre-production. An exemplary method for determining engine power losses are described in commonly assigned U.S. Patent Application Publication Number 2005/0256633 A2, entitled COST STRUCTURE METHOD INCLUDING FUEL ECONOMY AND ENGINE EMISSION CONSIDERATIONS, the contents of which are incorporated herein by reference.

It is understood that modifications in the hardware are allowable within the scope of the invention. The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for identifying preferred operating conditions for a powertrain, comprising:
    determining ranges of permissible inputs to a transmission;
    determining a plurality of motor torques input from first and second electrical machines to the transmission, each associated with one of the permissible inputs to the transmission and responsive to an output torque command;
    determining a plurality of operating costs based on inputs comprising the plurality of motor torques input from the first and second electrical machines to the transmission, the ranges of permissible inputs to the transmission and costs related to fuel economy, emissions and battery life, each operating cost associated with one of the motor torques input from the first and second electrical machines to the transmission and the associated permissible input to the transmission responsive to the output torque command; and,
    identifying a preferred input to the transmission responsive to the output torque command based upon the determined plurality of operating costs comprising identifying an input to the transmission and the motor torques input from the first and second machines corresponding to a minimum operating cost, wherein lower operating costs are associated with lower fuel consumption at high conversion efficiencies, lower battery power usage and lower emissions.

2. The method of claim 1, further comprising identifying preferred operating conditions for operating the powertrain in a continuously variable mode operating range state to meet an operator torque request.

3. The method of claim 1, wherein the ranges of permissible transmission inputs comprise a range of permissible transmission input speeds originating from an internal combustion engine.

4. The method of claim 1, wherein the ranges of permissible inputs to the transmission comprise a range of permissible input torques originating from an internal combustion engine.

5. The method of claim 1, wherein determining the plurality of motor torques input from the first and second electrical machines to the transmission comprises:
    iteratively selecting parametric values within the ranges of permissible inputs to the transmission, and,
    determining motor torques for each of the first and second electrical machines based upon the selected parametric values for the inputs to the transmission.

6. The method of claim 5, wherein each operating cost is determined based upon the selected parametric values for the inputs to the transmission and the determined motor torques input from the first and second electrical machines.

7. The method of claim 6, wherein each cost is determined based upon engine fuel consumption and electrical battery power cost associated with the transmission input and the motor torques for the first and second electrical machines.

8. Method to identify preferred conditions for operating a powertrain in a continuously variable mode operating range state, comprising:
    determining ranges of permissible engine inputs to the transmission;
    executing a two-dimensional search engine to iteratively generate parametric values of engine inputs within the ranges of permissible engine inputs to the transmission,
    determining motor torques for the first and second electrical machines for each of the iteratively generated parametric values of engine inputs corresponding to an output torque command;
    determining operating costs based on inputs comprising motor torques from the first and second electrical machines to the transmission, the iteratively generated parametric values of engine inputs to the transmission and costs related to fuel economy, emissions and battery life, each operating cost associated with one of the determined motor torques for the first and second electrical machines and the associated iteratively generated parametric values of engine inputs to the transmission; and,
    identifying preferred engine inputs to the transmission based upon the determined operating costs comprising identifying a preferred input torque and preferred first and second motor torques corresponding to a minimum operating cost.

9. The method of claim 8, further comprising controlling operation of the engine to achieve the preferred input torque.

* * * * *